June 16, 1942.  F. E. MONTGOMERY  2,286,825
SELF-ALIGNING BEARING CONSTRUCTION
Filed March 11, 1940
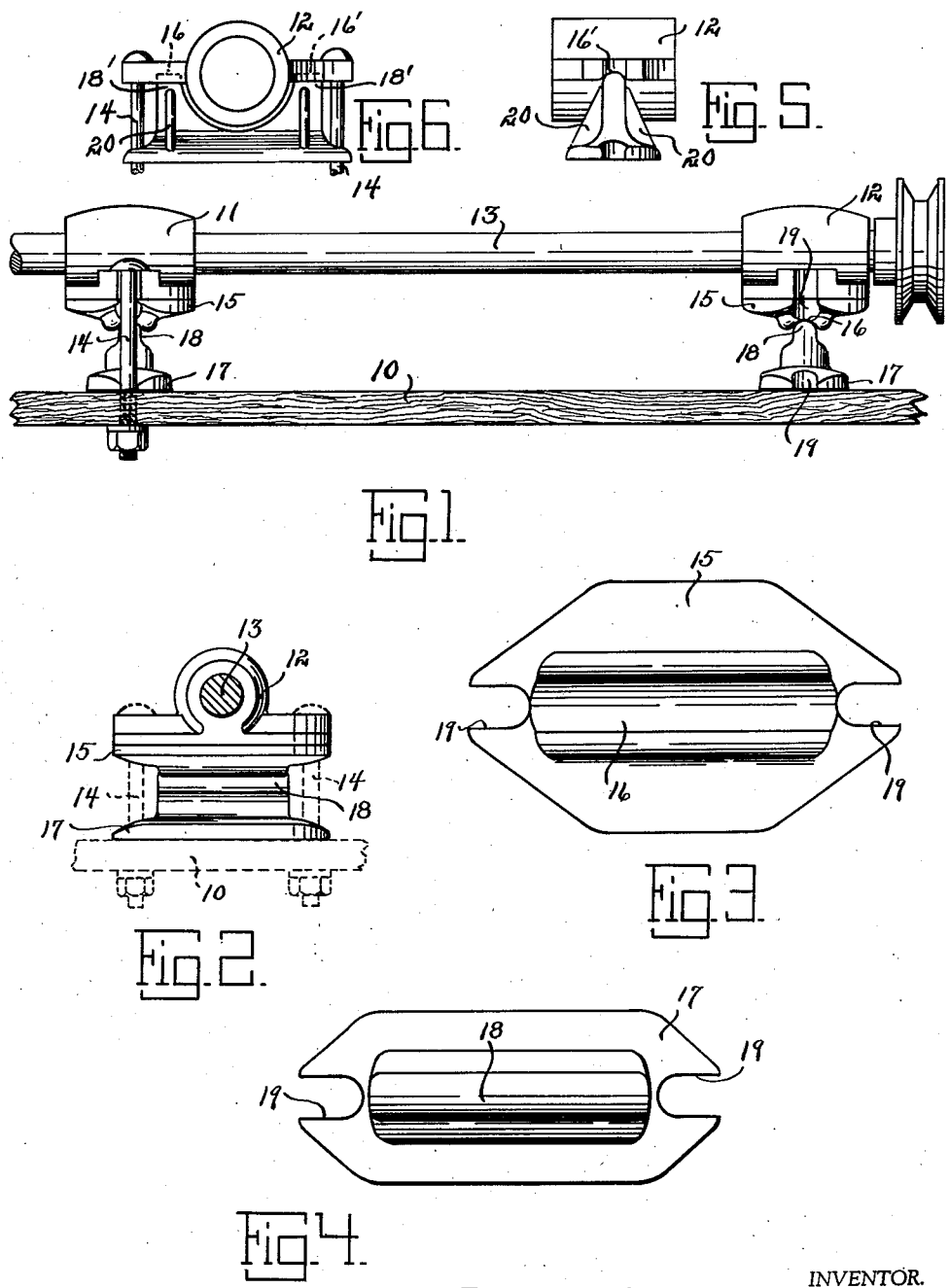
INVENTOR.
FRANCIS E. MONTGOMERY
BY M. Talbert Dick
ATTORNEY.

Patented June 16, 1942

2,286,825

UNITED STATES PATENT OFFICE 2,286,825

SELF-ALIGNING BEARING CONSTRUCTION

Francis E. Montgomery, Des Moines, Iowa

Application March 11, 1940, Serial No. 323,334

5 Claims. (Cl. 308—72)

The principal object of my invention is to provide a means which is a part of or associated with a bearing element, wherein the bearing element will automatically properly align itself to conform to the position of the shaft which it supports.

A further object of my invention is to provide a bearing construction and support that will not only make possible the self aligning of the bearing, but will also handle any thrust tendency in the shaft rotatably supported by the bearing proper.

A still further object of this invention is to provide a means for aligning bearings that is easily installed, economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of two bearings employing my method of alignment.

Fig. 2 is an end view of my self-aligning bearing construction.

Fig. 3 is an enlarged bottom view of the rocker plate used in my method as shown in Fig. 1.

Fig. 4 is an enlarged top plan view of the supporting bar block.

Fig. 5 is a side view of my bearing construction wherein the supporting bar block is utilized to carry any longitudinal thrust that might be experienced in certain types of bearing and shafts.

Fig. 6 is an end view of the specific construction shown in Fig. 5.

Whenever a plurality of bearings are used to rotatably support a shaft, it is a most difficult task to properly align the bearing members so that they will not bind the shaft. I have overcome such troubles as will hereinafter be appreciated.

Referring to the drawing, I have used the numeral 10 to designate a supporting member such as a work bench, a beam, wall, or like. The numerals 11 and 12 designate bearing members rotatably holding and supporting a shaft 13. The numeral 14 designates ordinary bolts for clamping and holding the bearing members to a supporting member such as the member 10. It is to such bearing elements that I provide my self-aligning feature and which I will now describe.

The numeral 15 designates the rocker plate portion of my device which is designed to fit on the bottom of a bearing as shown in Fig. 1. This member 15 is separate from the bearing as shown in Fig. 1, in order that it can be used on bearings now in use, but obviously this member 15 may be formed with and be at an integral part of the bearing itself, such as shown in Fig. 5 and Fig. 6. The numeral 16 designates an elongated channel on the bottom side of the plate 15 and which is circular in cross section. This channel groove 16 may be formed in the bottom of the member 15 in any suitable way. If the member 15 is cast, obviously this groove 16 may be formed and cast on the member 15 in a single operation. Obviously the groove 16 can be planed or formed in the member 15 or the bottom of the bearing itself by any suitable means or method so long as the curvature of the groove extends away from the bearing and the length of the same extends transversely of the shaft 13. The numeral 17 designates the supporting bar block which is designed to engage and rest upon a member 10. This supporting bar block has an upwardly extending elongated ridge 18. This ridge is elongated and its upper portion is circular in cross section and is of such dimensions as to enter and engage the circular channel groove 16 as shown in Fig. 1. By this arrangement, the plate 15, when resting on the member 18 as shown in Fig. 1, may rock longitudinally of the shaft 13, thereby making possible the automatic alignment of the bearing members. The members 15 and 17 each have cut away openings 19 at each end as shown in Fig. 3 and Fig. 4. When these members are installed with a bearing, the bolts 14 extend through these cut-away openings and thereby hold the members 15 and 17 against movement from under the bearing member. The diameter of the bolts 14 are such that a certain amount of play is provided at points where they pass through these members and through the bearing elements. When installing my self-aligning bearing construction, the member 15 is placed under the bearing element proper and the member 17 on the supporting member 10 and under the member 15 as shown in Fig. 1. The bolts 14 are inserted in their proper places and tightened. Usually by striking the head of the bolts, they set themselves and the bearing members will properly align themselves with and on the shaft 13. Also a small hammer tap on each of the bearing members will cause them to align properly with the shaft. Of course, immediately upon the rotation of the shaft 13 the bearing members 11 and 12 will automatically align properly inasmuch as each of the bearing members will be permitted a sufficient amount of rocking movement longitudinally with the shaft for self-centering purposes. From this arrangement, it will readily be seen that although the bearing members will be rigidly held by the function of the bolts 14, nevertheless, the bearing members may rock sufficiently to properly align themselves relative to each other and to the shaft 13.

In Figs. 5 and 6, I show the groove 16' formed on the under side of a bearing 12 and with the bar 18' extending upwardly and to the center plane of the bearing in order that the same may properly engage the bearing and handle any thrust tendencies. In order to accomplish this, the groove 16' lies at each side of the bearing sleeve housing as shown in Fig. 6, and the plane of these two groove bearing points transversely cut the center plane of the shaft in the bearing sleeve. Obviously with the pivot points on the member 18' at this plane, any thrust tendencies will be absorbed on the member 18' at the central plane of the bearing and therefore no tipping or binding action of the bearing will be experienced. In this construction, the outer portion of the member 18' is removed to clear the under side of the bearing sleeve housing. The member 18' may be strengthened by reinforcing ribs 20.

Although I have described the groove 16 and ridge 18' as circular in cross section, obviously they can be of different design. The ridge member 18 can be of wedge shape in cross section, but I recommend the structure as shown in the drawing, inasmuch as this construction provides more frictional contact surface and is of more durable and rigid construction.

Some changes may be made in the construction and arrangement of my improved self-aligning bearing construction without departing from the real spirit and purpose of my invention, and it is my intention to cover by my claims any modified forms of structure or use of mechanical equivalents which may be reasonably included within their scope.

I claim:

1. In a device of the class described, a bearing element having two oppositely extending arm projections on its periphery; said arm projections resting in a plane that substantially bisects the center of said bearing element, a groove on the under side of each of said arm projections, a base element, and two spaced apart parallel supporting lug elements extending from said base element for engaging said grooves, respectively for permitting the rocking movement of said bearing element relative to said base element; said lug elements extending transversely of the longitudinal axis of said bearing element.

2. In a device of the class described, a bearing element having two oppositely extending arm projections on its periphery; said arm projections resting in a plane that substantially bisects the center of said bearing element, a groove on the under side of each of said arm projections, a base element, and two spaced apart parallel supporting lug elements extending from said base element for engaging said grooves respectively for permitting the rocking movement of said bearing element relative to said base element; said lug elements extending transversely of the longitudinal axis of said bearing element, and a bolt means extending through each of said arm projections for securing said bearing element to a supporting means.

3. In a device of the class described, a bearing element having two oppositely extending arm projections on its periphery, a groove on the under side of each of said arm projections, a base element, two spaced apart supporting lug elements extending from said base element for engaging said grooves respectively for permitting the rocking movement of said bearing element relative to said base element, a hole through each of said arm projections, and a bolt means extending through each of said holes for securing said bearing element to a supporting means, said bolts being of a size smaller than the size of said holes.

4. In combination with a bearing and a supporting member, intermediate members supporting an interlocking tongue and groove structure whereby said intermediate members may pivot on one another, openings adjacent each side of said bearing, openings adjacent each end of said intermediate members, and bolt means extending through said openings securing said bearing and intermediate members to said supporting member, the size of said bolts being such that they are smaller than the openings in at least the bearing and the intermediate member adjacent to the bearing, for permitting the rocking movement of said bearing relative to said intermediate member.

5. In a device of the class described, a bearing element having two oppositely extending integral arm projections on its periphery, a supporting structure, two spaced apart supporting lug elements mounted at least indirectly on said supporting structure, and tongue and groove structure on the upper ends of said supporting lugs and the under side of said arm projections capable of intermeshing to permit rocking movement of said bearing element relative to said supporting structure.

FRANCIS E. MONTGOMERY.